(12) United States Patent
Tanaka

(10) Patent No.: US 7,303,133 B2
(45) Date of Patent: Dec. 4, 2007

(54) IMAGING MODULE

(75) Inventor: Toshiyuki Tanaka, Moriguchi (JP)

(73) Assignee: Sharp Kabushiki Kaisha, Osaka (JP)

( * ) Notice: Subject to any disclaimer, the term of this patent is extended or adjusted under 35 U.S.C. 154(b) by 269 days.

(21) Appl. No.: 11/175,654

(22) Filed: Jul. 5, 2005

(65) Prior Publication Data
US 2006/0006239 A1    Jan. 12, 2006

(30) Foreign Application Priority Data
Jul. 7, 2004   (JP)   ............... P2004-200438

(51) Int. Cl.
*G06K 7/10* (2006.01)
(52) U.S. Cl. ............... 235/470; 235/454; 235/462.43
(58) Field of Classification Search ................ 235/470, 235/462.11, 462.43–462.46, 472.01, 454
See application file for complete search history.

(56) References Cited

U.S. PATENT DOCUMENTS 6,616,046 B1 * 9/2003 Barkan et al. ......... 235/462.29
6,779,725 B2 * 8/2004 Kohchi et al. ............. 235/454
2003/0089776 A1 * 5/2003 Hennick et al. ........... 235/454
2006/0108427 A1 * 5/2006 Kawamuki et al. .... 235/472.01

FOREIGN PATENT DOCUMENTS

JP    2001-313873    11/2001

* cited by examiner

*Primary Examiner*—Thien M. Le
*Assistant Examiner*—Edwyn Labaze
(74) *Attorney, Agent, or Firm*—David G. Conlin; David A. Tucker; Edwards Angell Palmer & Dodge LLP

(57) ABSTRACT

An imaging module, which prevents a board on which an imaging device is mounted from being cracked by an impact, reduces a deviation between an imaging device and an optical axis of a lens system due to a temperature change and has high reliability, is obtained. The board (25) is fixed to a housing (23) in a first position located in neighborhood of the optical axis (C) of the lens system and the imaging device (4) by a first adhesive (16) of a high elastic modulus, and the board (25) is fixed to the housing (23) in the second position located farther away from the optical axis of the lens system than the first position by a second adhesive (17) of a low elastic modulus.

7 Claims, 8 Drawing Sheets

IMAGING MODULE

This nonprovisional application claims priority under 35 U.S.C. §119(a) on Patent Application No. 2004-200438 filed in Japan on Jul. 7, 2004, the entire contents of which are hereby incorporated by reference.

BACKGROUND OF THE INVENTION

The present invention relates to an imaging module that reads an image formed by a lens system by means of a solid-state imaging device of CCD (Charge Coupled Device) or the like.

Conventionally, there has been an imaging module that captures an image by means of a solid-state imaging device of CCD or the like as disclosed in JP 2001-313873 A (see FIGS. 2B and 3 thereof). In the imaging module, the solid-state imaging device is fixed to a frame that supports a lens system, with a cantilever structure via an intermediate retention member in order to facilitate positional adjustment of the solid-state imaging device with respect to the lens system.

Moreover, there is an imaging module, of which the schematic structure is shown in FIG. 4 (the imaging module is not a prior art and shown for the sake of convenience to clarify the problems of the present invention). The imaging module 1 is constructed of a lens assembly 2, a housing 3 that holds the lens assembly 2, and a board 5 to which an imaging device 4 is attached. As shown in FIG. 5, circuit devices 6 of DSP (Digital Signal Processor) and so on besides the imaging device 4 are mounted on the board 5, and the circuit devices 6 receive and process a signal from the imaging device 4 via wiring lines (not shown) on the board 5. The board 5 is made of a ceramic material of alumina or the like in order to improve heat radiation of the imaging device 4. Moreover, the housing 3 is made of a resin for achieving a light weight and a low cost.

The board 5 is adjusted in position with respect to the housing 3 so that the center position of the imaging device 4 coincides with an optical axis of the lens assembly 2 and fixed to the housing 3 by a fixation material 7 made of a ultraviolet curing type adhesive or the like.

Such imaging modules have been downsized and mounted on portable apparatuses of portable telephones and so on, and importance is attached to reliabilities of, in particular, impact resistance capabilities and temperature characteristics.

However, in the imaging module of JP 2001-313873 A, the imaging device is fixed to the frame by the intermediate retention member with the cantilever structure, and there is a difference in the thermal expansion coefficient between the imaging device and the intermediate retention member because of a material difference between the imaging device and the intermediate retention member. Accordingly, there is a problem that a deviation occurs between the optical axis of the lens system and the center of the imaging device when a temperature change occurs.

The imaging module 1 shown in FIG. 4 has a problem that the board 5 made of the ceramic material cracks at a portion indicated by arrow B when an impact is received in a direction of arrow A as a consequence of drop of the portable apparatus on a floor, a road surface or the like, resulting in a low impact resistance capability and malfunction of the imaging module 1.

SUMMARY OF THE INVENTION

An object of the present invention is to provide an imaging module that is hard to cause a deviation between the optical axis of the lens system and the center of the imaging device even if a temperature change occurs and has a high impact resistance capability.

In order to achieve the object, the imaging module of the present invention comprises:

a lens system;

a housing which holds the lens system;

an imaging device which outputs an electrical signal that represents an image formed by the lens system; and a board on which the imaging device is mounted, wherein the board is fixed to the housing by a first fixation material in at least one first position that is located in neighborhood of the imaging device and an optical axis of the lens system and located on both sides of a plane that includes the optical axis, and the board is fixed to the housing in at least one second position located farther away from the imaging device and the optical axis of the lens system than the first position by a second fixation material that has an elastic modulus lower than an elastic modulus of the first fixation material.

According to the above construction, the board is fixed to the housing in the first position that is located in the neighborhood of the imaging device and the optical axis of the lens system and located on both sides of the plane that includes the optical axis by the first fixation material of a high elastic modulus. Therefore, the board is held in the first position by the housing with the straddle structure, the board and the housing are fixed in the first position located in the neighborhood of the optical axis of the lens system, and the board and the housing are fixed by the first fixation material that has a high elastic modulus and a small thermal expansion coefficient. Therefore, the influence of the difference in the thermal expansion between the board and the housing and the thermal expansion of the first fixation material is a little, and a deviation is hard to occur between the optical axis of the lens system and the center of the imaging device.

Moreover, the board is fixed to the housing in the second position located farther away from the imaging device and the optical axis of the lens system than the first position by the second fixation material that has an elastic modulus lower than the elastic modulus of the first fixation material. Therefore, even if an impact is applied from the outside to the imaging module, the board can be prevented from cracking since the board is backed up in the second position located away from the optical axis of the lens system by the housing via the second fixation material. Furthermore, since the second fixation material has an elastic modulus lower than the elastic modulus of the first fixation material and is comparatively elastic, the board is supported elastically (with elasticity) in the second position located away from the optical axis of the lens system by the second fixation material, and the impact resistance becomes extremely high.

Moreover, the quantity of thermal expansion is increased with an increase in size. Therefore, a large thermal strain seeks to occur due to the difference in the quantity of thermal expansion between the board and the housing because the board and the housing are fixed to each other in the second position located away from the optical axis of the lens system. However, since the elastic modulus of the second fixation material is low, the thermal strain is absorbed by the second fixation material, and an asymmetrical strain that seeks to occur in the board and the housing can be extremely reduced. Therefore, the deviation between the optical axis of the lens system and the center of the imaging device can be reduced even if a temperature change occurs.

In one embodiment, the second position is located at an end portion of the board.

According to the embodiment, the end portion of the board is backed up by the housing via the second fixation material, and therefore, the impact resistance of the board can be improved.

Furthermore, the second position is located at the end portion of the board, and the applying position is definite when the second fixation material of, for example, an adhesive is applied. Therefore, the bonding work can easily be performed.

In one embodiment, the housing has a main body part that holds the lens system and an extension part that extends from the main body part, and the extension part and the board are fixed to each other in the second position by the second fixation material.

According to the embodiment, the board is backed up in the second position of the board away from the imaging device and the optical axis of the lens system by the extension part of the housing via the second fixation material of a low elastic modulus, and therefore, the impact resistance can be improved even if the board is long.

Moreover, the imaging module of the present invention comprises:

a lens system;

a housing which has a main body part that holds the lens system and an extension part that extends from the main body part;

an imaging device which outputs an electrical signal that represents an image formed by the lens system; and a board on which the imaging device is mounted, wherein the board is fixed to the main body part of the housing in at least one first position that is located in neighborhood of the imaging device and an optical axis of the lens system and located on both sides of a plane that includes the optical axis and fixed to the extension part of the housing in at least one second position located farther away from the imaging device and the optical axis of the lens system than the first position by at least one fixation material.

According to the above construction, the board is fixed to the main body part of the housing in the first position located in the neighborhood of the imaging device and the optical axis of the lens system and located on both sides of the plane that includes the optical axis by the fixation material with the straddle structure. As described above, the main body part of the housing that holds the lens system is fixed to the board with a straddled manner in the first position located in the neighborhood of the optical axis of the lens system. Therefore, the influence due to the difference in the thermal expansion between the board and the housing is a little, and a deviation is hard to occur between the optical axis of the lens system and the center of the imaging device.

Moreover, the board is fixed to the extension part of the housing in the second position located farther away from the imaging device and the optical axis of the lens system than the first position by the fixation material. Therefore, the board is backed up by the extension part of the housing via the fixation material in the second position located away from the imaging device and the optical axis of the lens system even if an impact is applied from the outside to the imaging module. Therefore, the board can be prevented from cracking, and the impact resistance becomes extremely high.

Moreover, a space is secured on a side opposite to a side of the extension part of the housing facing the board, and necessary parts can be placed in the space.

In one embodiment, the at least one fixation material are a first fixation material and a second fixation material that has an elastic modulus lower than an elastic modulus of the first fixation material, the board is fixed to the main body part of the housing in the first position by the first fixation material, and the board is fixed to the extension part of the housing in the second position by the second fixation material.

The quantities of thermal expansion of the board and the housing are increased with an increase in size. Therefore, due to the board and the extension part of the housing fixed to each other in the second position located away from the optical axis of the lens system, a large strain seeks to occur in the board and the housing. However, since the elastic modulus of the second fixation material is low, the second fixation material absorbs the strain, and the strain, which seeks to occur in the board and the housing, can be extremely reduced. Therefore, the deviation between the optical axis of the lens system and the center of the imaging device can be reduced even if a temperature change occurs.

In one embodiment, a circuit device is mounted on a portion of the board that overlaps the extension part of the housing.

According to the embodiment, even when the board is elongated to mount the circuit device, the extension part of the housing overlaps the portion of the board on which the circuit device is mounted and is fixed thereto by the fixation material. Therefore, the board can be backed up, and the impact resistance of the board can be improved.

According to the present invention, an imaging module, which has a little deviation of the center of the imaging device with respect to the optical axis of the lens system even if a temperature change occurs and in which the board is hard to crack and has a high impact resistance, can be obtained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
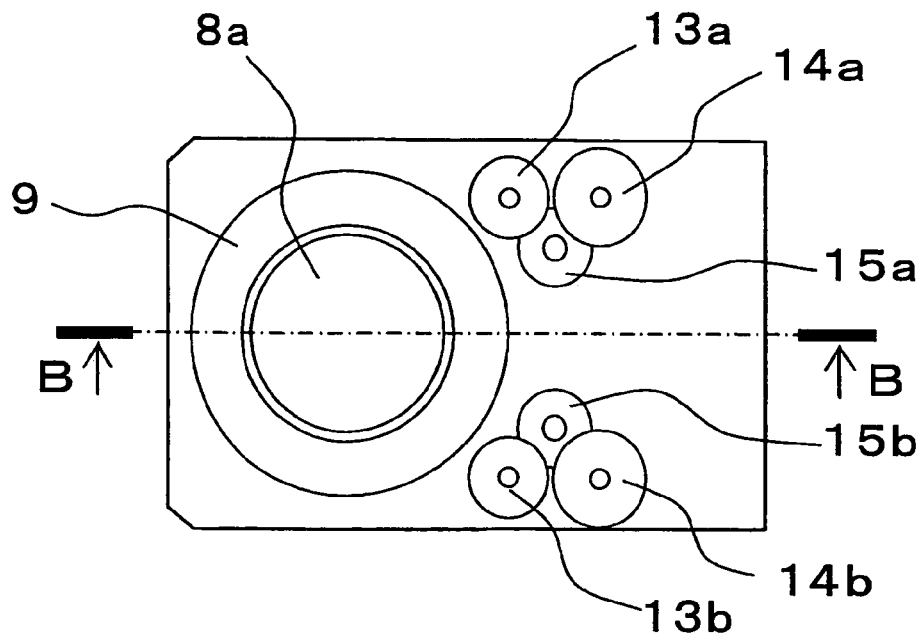
FIG. 1A is a plan view of an imaging module according to a first embodiment of the present invention.
Figure 1B:
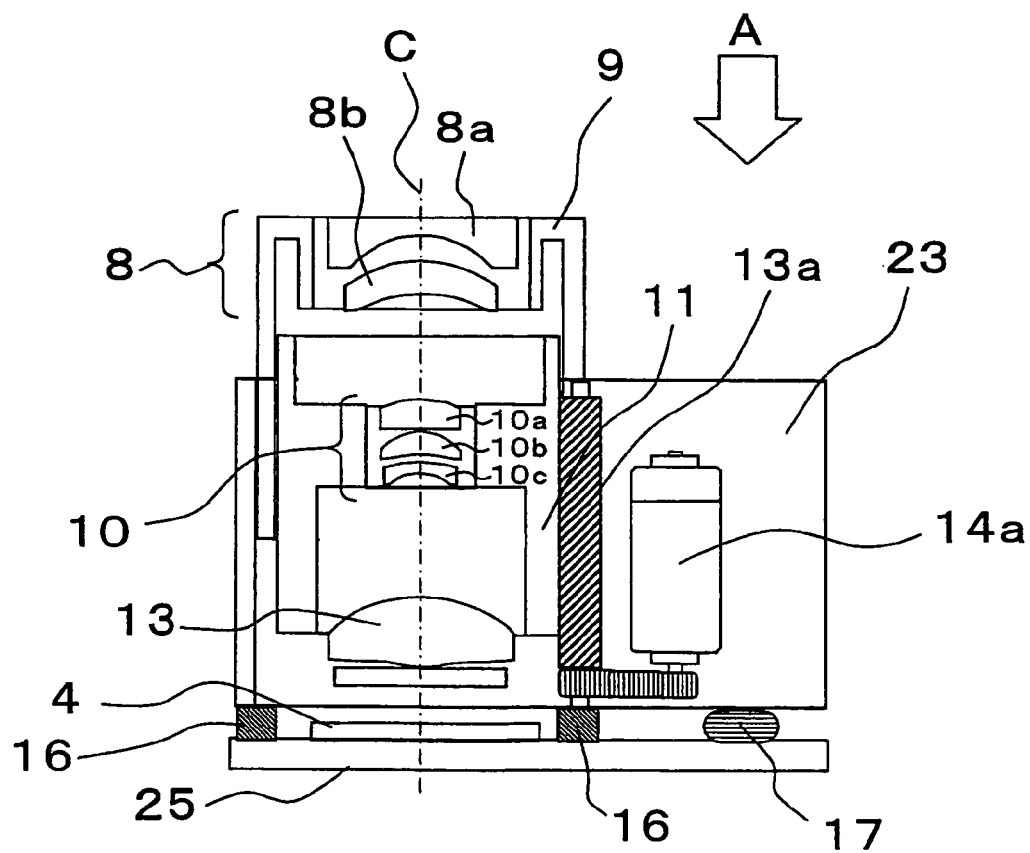
FIG. 1B is a sectional view taken along the line B-B of FIG. 1A, in which a lens system of the imaging module of the first embodiment is projected.
Figure 1C:
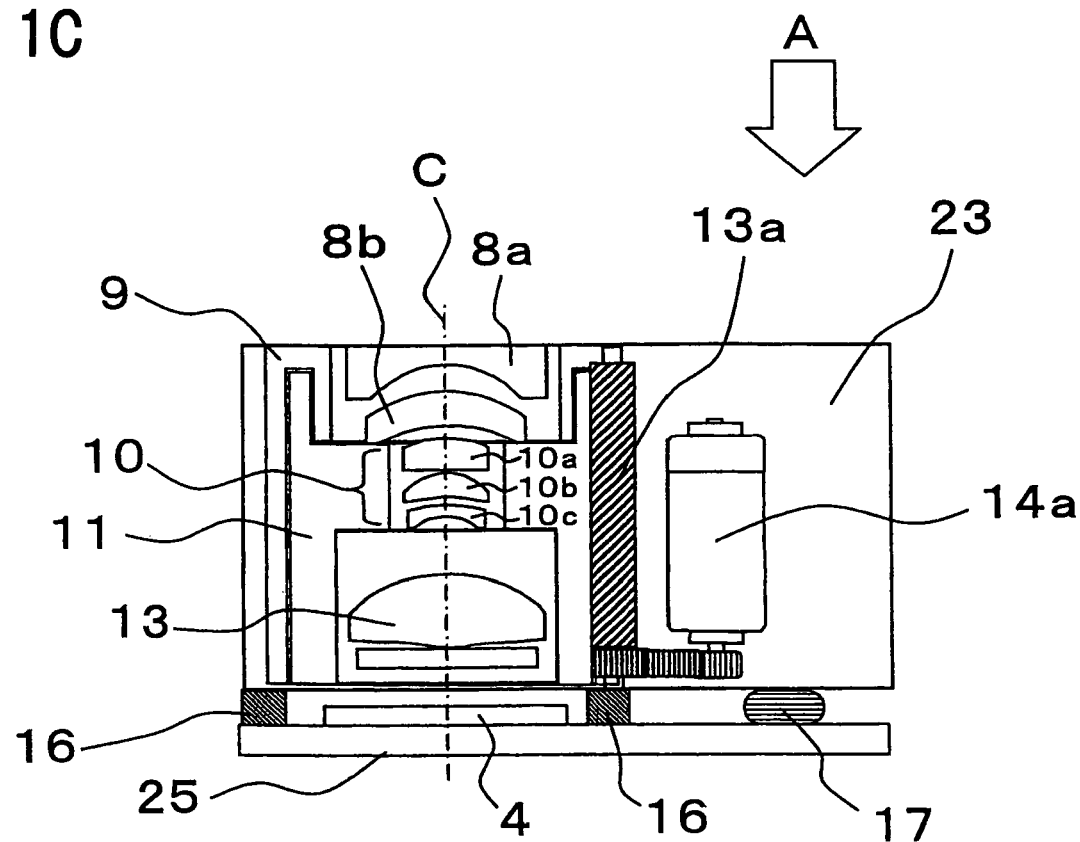
FIG. 1C is a sectional view showing a state in which the lens system of the imaging module of the first embodiment is retracted.

FIG. 1A is a plan view of an imaging module of the first embodiment. FIG. 1B is a sectional view of the imaging module taken along the line B-B of FIG. 1A when the lens system is in a projected state. FIG. 1C is a sectional view of the imaging module when the lens system is in a housed state.

As shown in FIG. 1B, the lens system of the imaging module is constructed of a first lens assembly 8, a second lens assembly 10 and a third lens assembly 13, and an image formed by the first through third lens assemblies 8, 10 and 13 is read by an imaging device 4. The first lens assembly 8 is constructed of two lenses 8a and 8b, housed and fixed in a first lens assembly holder 9 and made displaceable in the direction of the optical axis C of the lens system for focusing. The second lens assembly 10 is constructed of three lenses 10a, 10b and 10c, housed and fixed in a second lens assembly holder 11 and made displaceable in the direction of the optical axis C to give magnification for zooming. The third lens assembly 13 is constructed of one lens and fixed to, for example, a housing 23 made of a resin of polycarbonate or the like. As described above, the housing 23 retractably holds the first lens assembly 8 and the second lens assembly 10 via the first lens assembly holder 9 and the second lens assembly holder 11, respectively, and statically holds the third lens assembly 13.

The first lens assembly holder 9 is connected to a first lead screw 13a that is rotated via a first gear 15a (see FIG. 1A) by a first motor 14a by means of a connection member (not shown) and made displaceable in the direction of the optical axis C. Moreover, the second lens assembly holder 11 is connected to a second lead screw 13b that is rotated via a second gear 15b by a second motor 14b as shown in FIG. 1A by means of a connection member (not shown) and made displaceable in the direction of the optical axis C.

Moreover, the imaging device 4, which is constructed of, for example, a CCD is mounted and fixed to a board 25 made of, for example, an alumina ceramic material. The board 25 is adjusted in position so that the center of the imaging device 4 coincides with the optical axis C and thereafter adhesively fixed to the housing 3 by the first adhesive 16 as one example of the first fixation material in first positions located in the neighborhood of the imaging device 4 and the optical axis C or, more in detail, in the first positions located as near as possible to the imaging device 4 and the optical axis C. The first adhesive 16 is applied to the four first positions symmetrical with respect to the optical axis C and fixes the housing 23 and the board 25 with a straddle structure. As described above, the first adhesive 16 is provided two by two on both sides of a plane that is located in the neighborhood of the imaging device 4 and the optical axis C and includes the optical axis C, and the housing 6 supports the board 25 with the straddle structure. Therefore, even if a temperature change occurs, the thermal expansion is canceled on both sides of the plane that includes the optical axis C, and the deviation between the optical axis C of the lens system and the center of the imaging device 4 is reduced. If the housing supports the board with a cantilever structure from one side of the plane that includes the optical axis, then the difference in the thermal expansion due to the temperature change is not canceled, and the deviation between the optical axis of the lens system and the center of the imaging device is becomes large.

Moreover, the first adhesive 16 is the adhesive that has a comparatively high elastic modulus after being hardened and is concretely provided by, for example, adhesives of the brand names of Cemedine EP171 (thermosetting), Cemedine CS2340-54 (two-liquid type) and so on. The first adhesive 16 has a comparatively high elastic modulus and a small thermal expansion coefficient. Therefore, the influence of the thermal expansion is a little, and the deviation between the optical axis C of the lens system and the center of the imaging device 4 can be reduced.

The board 25 is adhesively fixed to the housing 23 by means of a second adhesive 17 as one example of the second fixation material in at least one second position located farther away from the optical axis C than the first position to which the first adhesive 16 is applied. As described above, by fixing the board 25 to the housing 23 by the second adhesive 17 in the second position, the housing 23 receives an impact force via the second adhesive 17 even if the impact force is applied in the direction of arrow A shown in FIGS. 1B and 1C. Therefore, the deformation of the board 25 is a little, and the board 25 is prevented from cracking.

Moreover, the second adhesive 17 is the adhesive that has a comparatively low elastic modulus after being hardened and is concretely provided by, for example, adhesives of the brand names of TSE326, TSE3260 and TSE326M of Toshiba Silicones, Sealant 45 (Shin-Etsu Chemical Co., Ltd.), Pure Sealant (Shin-Etsu Chemical Co., Ltd.) and so on. The second adhesive 17 has an elastic modulus lower than the elastic modulus of the first adhesive 16. The reasons are described below.

The board 25 is made of alumina ceramic of good thermal conductivity to suppress the temperature rise of the imaging device 4 as far as possible. On the other hand, the material of the housing 23, to which the board 25 is attached, is a resin of polycarbonate or the like. The linear expansion coefficient of alumina ceramic is $7.0 \times 10^{-6}$, and the linear expansion coefficient of polycarbonate is $7.0 \times 10^{-5}$, and, therefore the linear expansion coefficients of the materials of the board 25 and the housing 23 differ from each other by one order of magnitude. Therefore, when a temperature change of 50° C. occurs in the case of, for example, a member of a length of 10 mm, there is a difference:

$$50 \times (7.0-0.7) \times 10^{-5} \times 10 = 50 \times 6.3 \times 10^{-5} \times 10 = 0.0315 \text{ (mm)}$$

in expansion between alumina ceramic and polycarbonate. The difference in expansion causes a positional deviation between the optical axis C and the center of the imaging device 4 and causes a thermal stress in the adhesive that is bonding the two members together.

In order to prevent the positional relation between the optical axis C of the lens system and the center of the imaging device 4 from changing even if a temperature change occurs, the positional relation is maintained to some extent by applying the first adhesive 16 symmetrically with respect to the optical axis C.

However, if an adhesive of the same high elastic modulus as that of the first adhesive 16 is provided on the end portion side of the board 25 extending in one direction with respect to the optical axis C, the symmetricity of heat strain in the board 25 and the housing 23 with respect to the optical axis C is collapsed by the thermal stress of the adhesive of a high elastic modulus, and the positional relation of the center of the imaging device 4 with respect to the optical axis C is changed when a temperature change occurs.

Accordingly, in the first embodiment, the collapse of the symmetricity due to the thermal stress is suppressed to a minimum by using the second adhesive 17 of an elastic modulus lower than that of the first adhesive 16 in the second position located away from the optical axis C in order to suppress the change in the positional relation to a minimum. In other words, by absorbing the difference in the thermal expansion between the board 25 and the housing 23 by the second adhesive 17 of a low elastic modulus, the asymmetrical thermal strains of the board 25 and the housing 23 can be extremely reduced. Therefore, the deviation between the optical axis C of the lens system and the center of the imaging device 4 can be reduced even if a temperature change occurs.

Moreover, the board 25 is fixed to the housing 23 by the second adhesive 17 in the second position located farther away from the optical axis C of the lens system than the first position. Therefore, even if an impact is applied from the outside as indicated by the arrow A in FIGS. 1B and 1C, the board 25 is hard to crack since it is backed up by the housing 23 via the second adhesive 17 in the second position. In particular, since the second adhesive 17 is elastic with the elastic modulus lower than the elastic modulus of the first adhesive 16, the board 25 is elastically supported by the second adhesive 17 in the second position located away from the optical axis C of the lens system, and the impact resistance becomes extremely high.

Figure 2A:
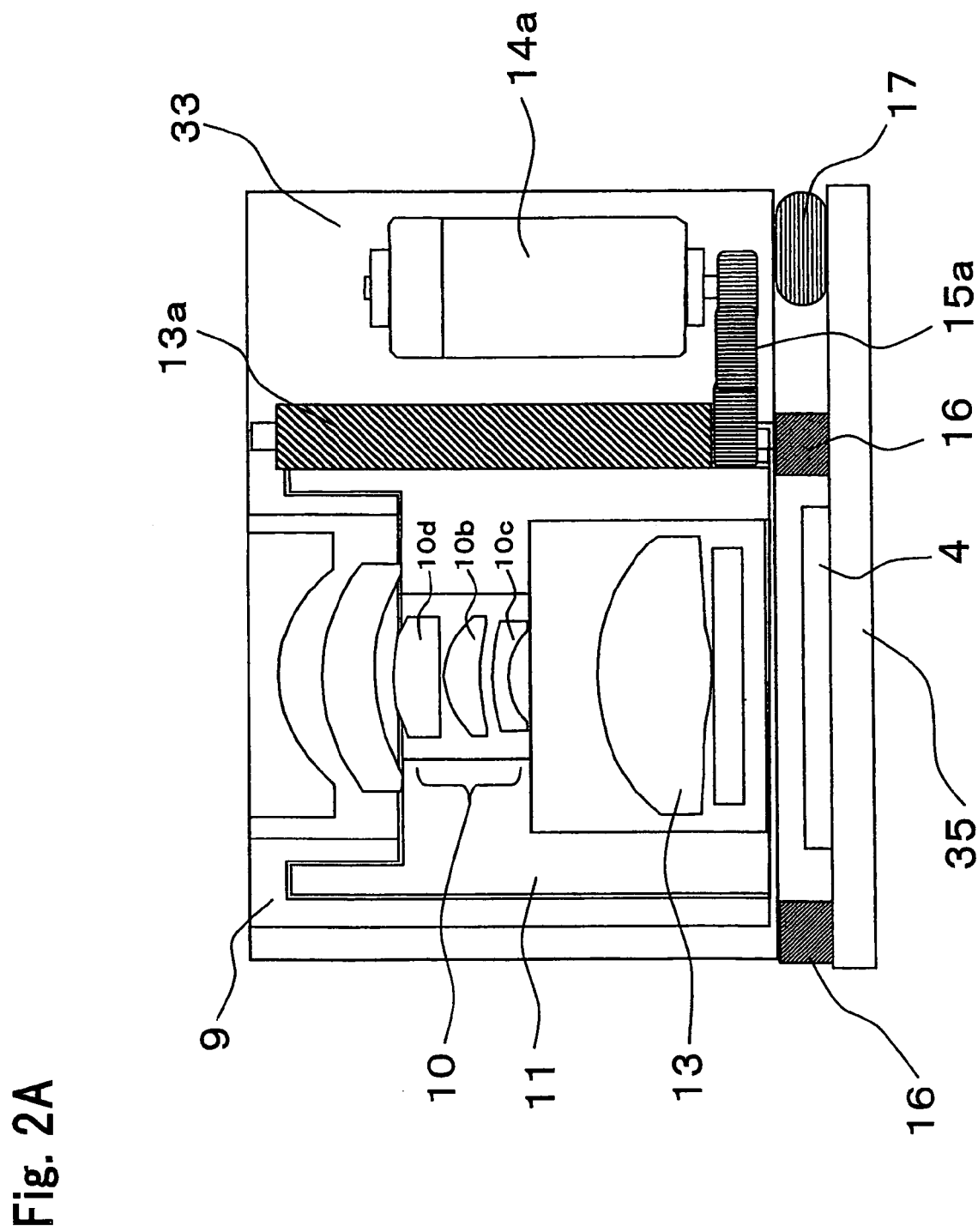
FIG. 2A is a sectional view of an imaging module according to a second embodiment of the present invention.

FIG. 2A is a sectional view of an imaging module of the second embodiment. In FIG. 2A, the same constituent members as the constituent members of FIGS. 1A through 1C are denoted by the same reference numerals with no description provided therefor, and different constituent members are described below.

As shown in FIG. 2A, a board 35 and a housing 33 have comparatively short dimensions in the sidewise direction, and the second adhesive 17 is applied to the end portion of the board 35, fixing the board 35 and the housing 33 in the second position located at the end portion of the board 35 and the housing 33.

Figure 2B:
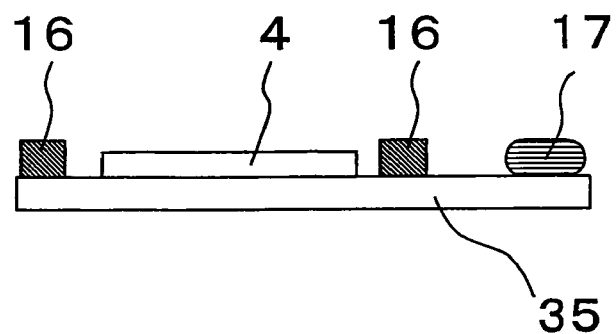
FIG. 2B is a front view of the essential part of the imaging module of the second embodiment.
Figure 2C:
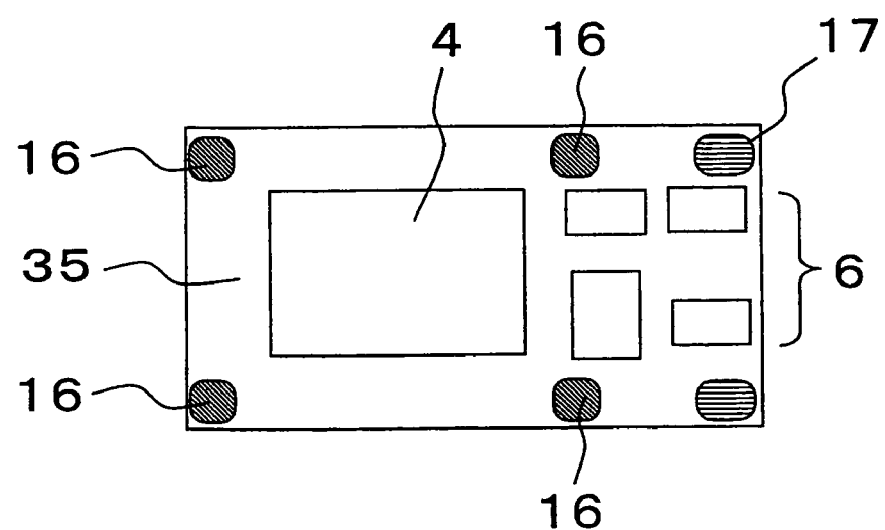
FIG. 2C is a plan view of the essential part of the imaging module of the second embodiment.

FIG. 2B is a front view showing the relations among the board 35, the imaging device 4, the first adhesive 16 of a high elastic modulus and the second adhesive 17 of a low elastic modulus. FIG. 2C is a plan view of FIG. 2B. In FIG. 2C, the reference numeral 6 denotes circuit devices of DSP and so on mounted on the board 35.

According to the construction, the end portion of the board 35 is backed up by the housing 33 via the second adhesive 17 of a low elastic modulus, and therefore, the end portion of the board 35 is prevented from cracking, allowing the impact resistance of the board 35 to be improved.

Further, the position to which the second adhesive 17 is applied is located at the end portion of the board 35. Therefore, the applying position is definite, and the bonding work can easily be performed without concern for the applying position.

Figure 2D:
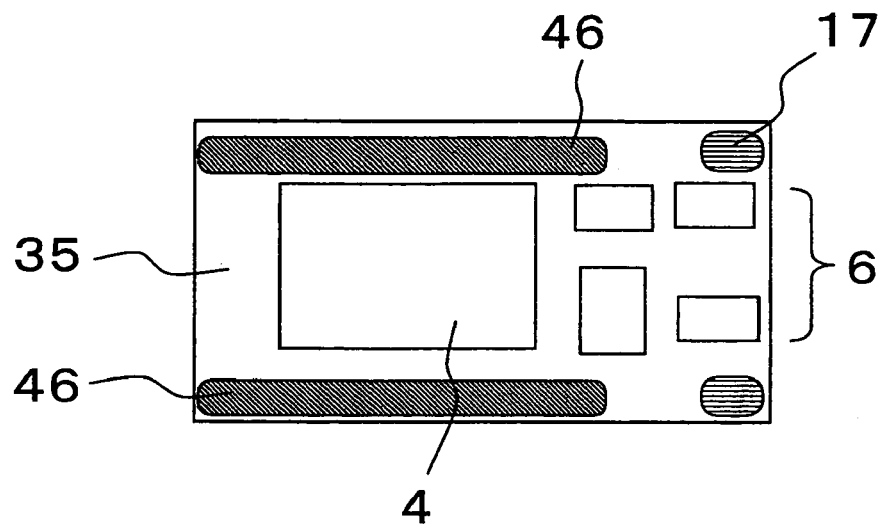
FIG. 2D is a plan view of the essential part of a modification example of the second embodiment.
Figure 2E:
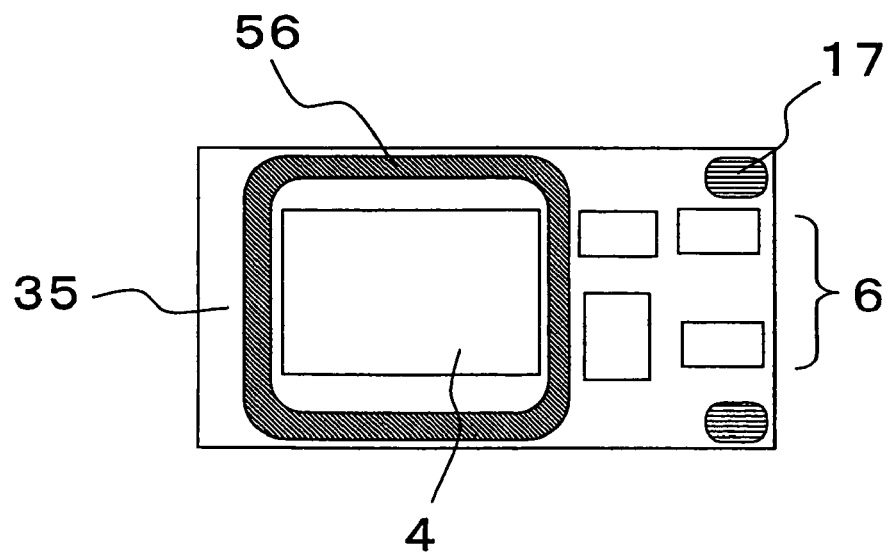
FIG. 2E is a plan view of the essential part of a modification example of the second embodiment.

FIGS. 2D and 2E are plan views showing the essential parts of modification examples of the second embodiment. In the modification example shown in FIG. 2D, a first adhesive 46 of an elastic modulus higher than that of the second adhesive 17 is arranged in a belt-like shape in first positions located on both sides and in the neighborhood of the imaging device 4. Moreover, in the modification example shown in FIG. 2E, a first adhesive 56 of an elastic modulus higher than that of the second adhesive 17 is arranged in a roughly rectangular annular shape in a first position located around the entire periphery and in the neighborhood of the imaging device 4.

Figure 3:
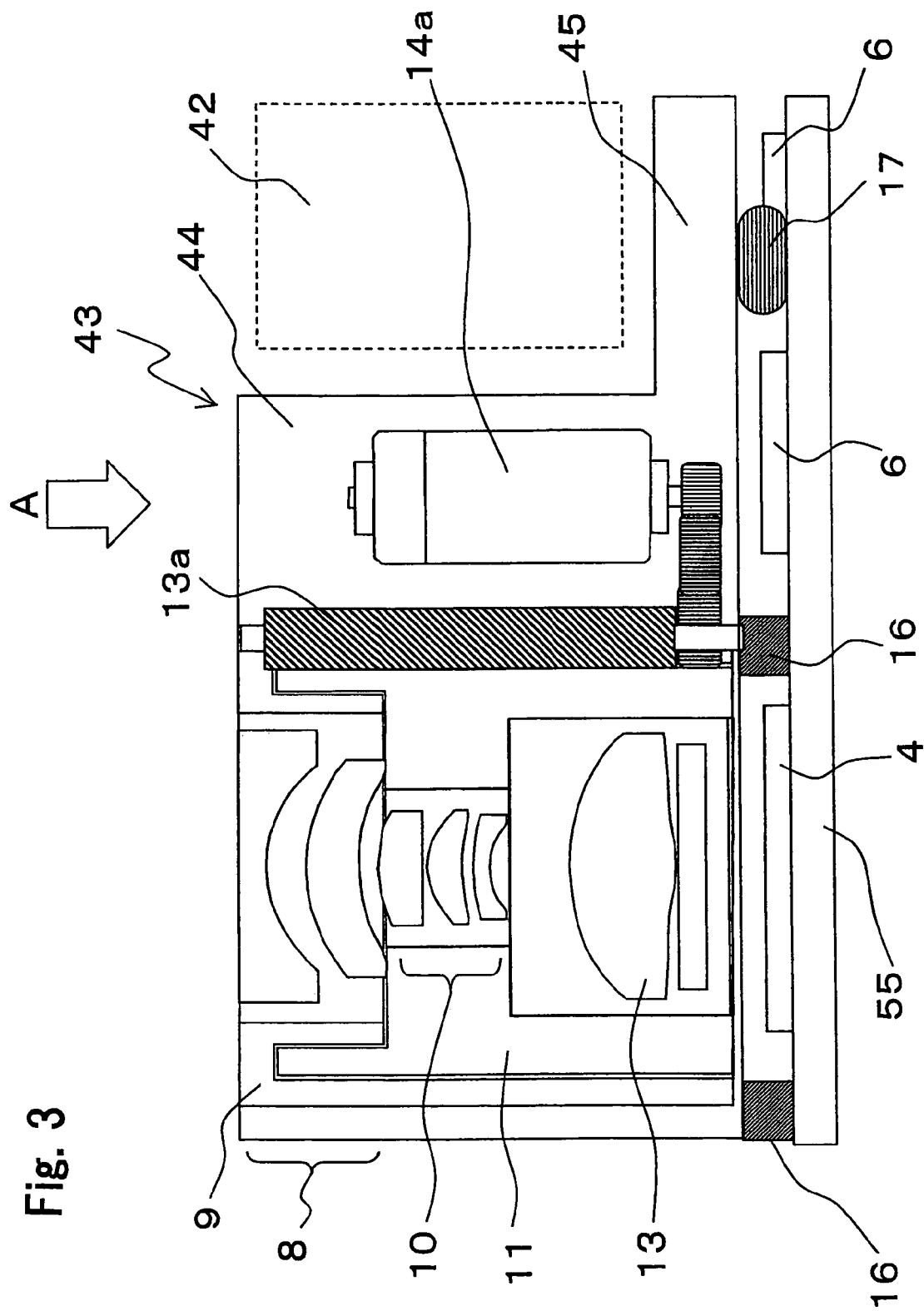
FIG. 3 is a sectional view of an imaging module according to a third embodiment of the present invention.
Figure 4:
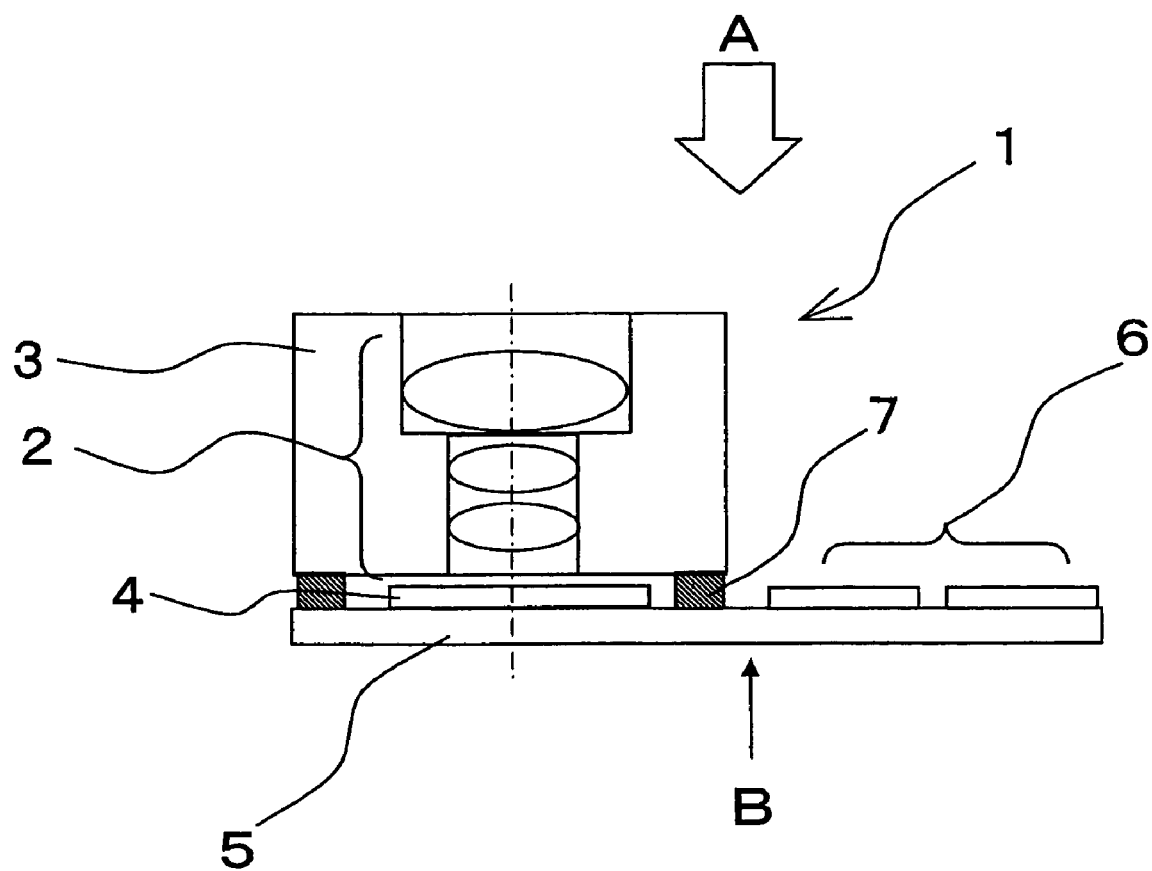
FIG. 4 is a view showing the schematic construction of a conventional imaging module.
Figure 5:
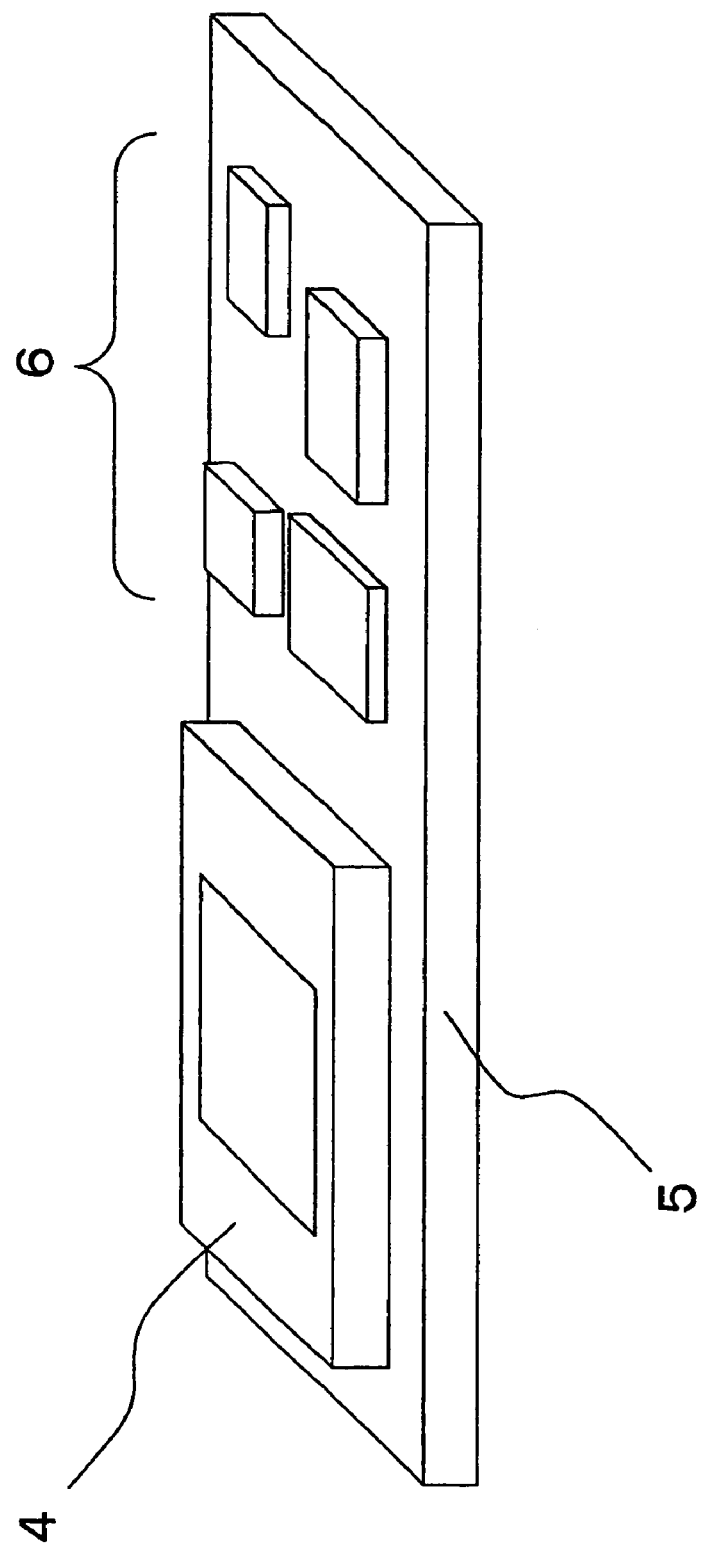
FIG. 5 is a schematic view showing a state in which an imaging device is mounted on a board.

FIG. 3 is a sectional view showing an imaging module of the third embodiment of the present invention. In FIG. 3, the same constituent members as the constituent members of FIGS. 1A through 1C are denoted by the same reference numerals with no description provided therefor, and the different constituent members are described below.

As shown in FIG. 3, the dimensions in the sidewise direction of a board 55 and a housing 43 of the imaging module of the third embodiment are made longer than the dimensions in the sidewise direction of the board 25 and the housing 23 of the imaging module of the first embodiment of FIGS. 1A through 1C.

The housing 43 is constructed of a main body part 44 and an extension part 45 that extends in the sidewise direction from the lower portion of the main body part 44. The main body part 44 of the housing 43 holds the lens system by retractably holding the first lens assembly 8 and the second lens assembly 10 via the first lens assembly holder 9 and the second lens assembly holder 11, respectively, and statically holding the third lens assembly 13. The extension part 45 has a necessary minimum thickness to back up and reinforce the long board 55 via the second adhesive 17 and secures a space 42 above the extension part 45, allowing the necessary components to be placed in the space 42.

The extension part 45 of the housing 43 and the long board 55 are fixed in the second position located farther away from the optical axis of the lens system than the first position of the first adhesive 16 by the second adhesive 17 of an elastic modulus lower than that of the first adhesive 16. The circuit devices 6 of DSP and so on are mounted on the portion of the board 55 below the extension part 45.

The board 55 and the housing 43 are elongated and have a large quantity of thermal expansion. The board 55 is fixed in the first position located in the neighborhood of the optical axis of the lens system to the main body part 44 of the housing 43, and the board 55 is fixed in the second position located away from the optical axis to the extension part 45 of the housing 43. Therefore, a large strain asymmetrical with respect to the board 55 and the housing 43 seeks to occur. However, since the elastic modulus of the second adhesive 17 is low, the second adhesive 17 absorbs the strain and extremely reduces the strain that seeks to occur in the board 55 and the housing 43, so that the collapse of the symmetry due to the thermal stress can be suppressed to a minimum. Therefore, the deviation between the optical axis of the lens system and the center of the imaging device 4 can be reduced even if a temperature change occurs.

Moreover, even if an impact is applied from the outside as indicated by arrow A in FIG. 3, the board 55 on which the circuit devices 6 are mounted is backed up in the second position by the extension part 45 of the housing 43 via the second adhesive 17, and therefore, the board is hard to crack even when it is long. In particular, since the second adhesive 17 has the elastic modulus lower than the elastic modulus of the first adhesive 16 and is elastic, the long board 55 is to be elastically supported by the second adhesive 17 in the second position located away from the optical axis C of the lens system, and the impact resistance becomes extremely high.

Although the elastic moduli of the first adhesive 16 and the second adhesive 17 have been different from each other in the third embodiment, it is acceptable to use an adhesive of the same elastic modulus and back up the board 55 by the extension part 45 of the housing 43 via the adhesive, preventing the board 55 from cracking.

Moreover, although the adhesives have been used as the fixation materials in the first through third embodiments, it is acceptable to use solder or the like.

Moreover, although the first adhesive 16 as the first fixation material has been applied to the first positions symmetrically with respect to the optical axis of the lens system in the first through third embodiments, the first positions may be asymmetric with respect to the optical axis so long as the positions are located on both sides of the plane that includes the optical axis of the lens system.

The imaging module of the present invention can be utilized for CCD cameras for portable telephones, digital cameras and so on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging module comprising:
   a lens system;
   a housing which holds the lens system;
   an imaging device which outputs an electrical signal that represents an image formed by the lens system; and
   a board having the imaging device mounted thereon, wherein
   a first fixation material fixes the board to the housing at at least one first position on the board in a neighborhood of the imaging device and an optical axis of the lens system on both sides of a plane that includes the optical axis, and a second fixation material having an elastic modulus lower than an elastic modulus of the first fixation material fixes the board to the housing at least one second position farther away from the imaging device and the optical axis of the lens system than the first position on the same side of said plane.

2. The imaging module as claimed in claim 1, wherein the second position on the board comprises an end portion thereof.

3. The imaging module as claimed in claim 1, wherein the housing has a main body part that holds the lens system and an extension part that extends from the main body part, and the second fixing material fixes the extension part and the board to each other at the second position on the board.

4. The imaging module as claimed in claim 3, wherein a portion of the board that overlaps the extension part of the housing has a circuit device mounted thereon.

5. An imaging module comprising:
   a lens system;
   a housing which has a main body part that holds the lens system and an extension part that extends from the main body part;
   an imaging device which outputs an electrical signal that represents an image formed by the lens system; and
   a board having the imaging device mounted thereon, wherein
   at least one fixing material fixes the board to the main body part of the housing at at least one first position on the board in a neighborhood of the imaging device and —an optical axis of the lens system on both sides of a plane that includes the optical axis and fixes the extension part of the housing at at least one second position located on the board farther away from the imaging device and the optical axis of the lens system than the first position.

6. The imaging module as claimed in claim 5, wherein the at least one fixation material comprises a first fixation material and/or a second fixation material that has an elastic modulus lower than an elastic modulus of the first fixation material,
   the first fixing material fixes the board to the main body part of the housing in the first position, and
   the second fixing material fixes the board to the extension part of the housing in the second position.

7. The imaging module as claimed in claim 5, wherein a portion of the board that overlaps the extension part of the housing has a circuit device mounted thereon.

* * * * *